July 21, 1931.  L. J. JONES  1,815,407

HOSE COUPLING

Filed Aug. 27, 1929

L. J. Jones, Inventor

By C. A. Snow & Co.
Attorneys

Patented July 21, 1931

1,815,407

UNITED STATES PATENT OFFICE

LEANDER J. JONES, OF HIGH POINT, NORTH CAROLINA

HOSE COUPLING

Application filed August 27, 1929. Serial No. 388,745.

This invention relates to detachable pipe and hose couplings and aims to provide novel means whereby hose sections may be securely clamped together insuring a fluid tight connection between the sections.

An important object of the invention is to provide a coupling of this character including a pivoted locking member so constructed that when the locking member is moved to its locked position, the sections of the coupling will be wedged together.

A still further object of the invention is to provide a pivoted locking member having means to clamp one of the hose sections to hold the pivoted locking member against accidental displacement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings.

Figure 1:
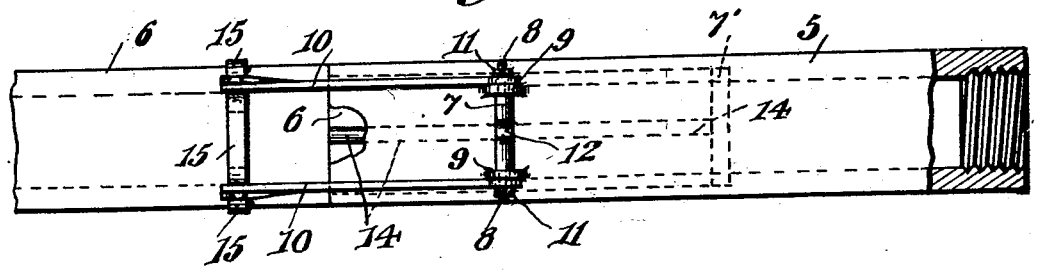
Figure 1 is a plan view of a coupling constructed in accordance with the invention.
Figure 2:
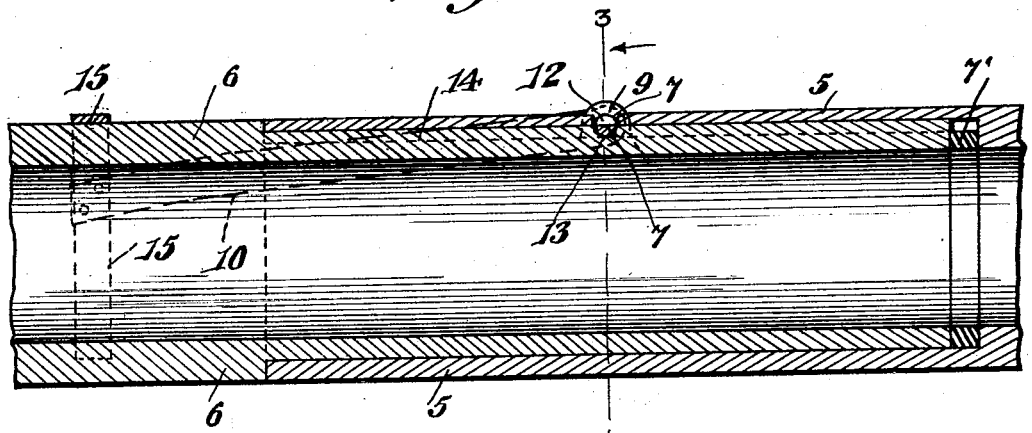
Figure 2 is a longitudinal sectional view through the coupling in its locked position.
Figure 3:
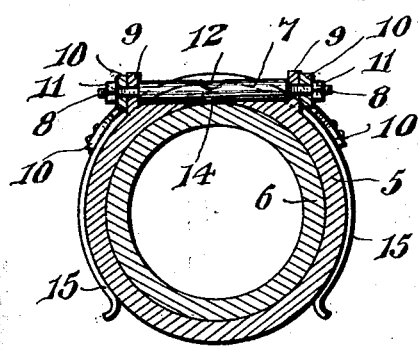
Figure 3 is a sectional view taken on line 3—3 of Figure 2.
Figure 4:
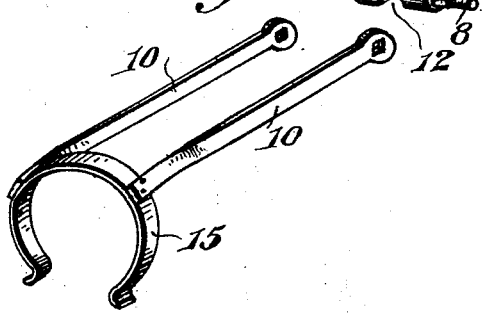
Figure 4 is a perspective view of the locking member.

Referring to the drawings in detail, the coupling embodies tubular metallic sections 5 and 6 respectively, the section 6 being provided with a reduced portion to permit the same to be slid into the section 5, in a manner as shown by Figure 2 of the drawings.

The section 5 is provided with a cut away portion formed in the upper edge thereof, which cut away portion accommodates the locking bar 7 which is formed with extensions 8 that are fitted in the openings of the upstanding ears 9 forming a part of the section 5. These extensions 8 are provided with flattened portions that cooperate with flattened portions of the openings formed at the inner ends of the arms 10, so that rotary movement of the arms will result in rotary movement of the locking bar 7 to move the locking bar to its active or inactive position, in a manner to be hereinafter more fully described. Nuts 11 are positioned on the ends of the extensions 8 and act to secure the arms on the extensions and prevent lateral movement of the arms.

The locking bar 7 is formed with a cut out portion 12 disposed intermediate its ends, the cut out portion providing a clearance for the section 6, when it is moved into the section 5. A recess 13 is formed in the upper surface of the section 6, and is of a size to accommodate the bar 7, when the bar is rotated in locking the sections together. Thus it will be seen that due to this construction, the section 6 of the coupling will be moved into the section 5 bringing the inner end of the section 6 into close engagement with the gasket 7' insuring a fluid tight connection between the sections of the coupling.

In order that the sections 5 and 6 will be properly aligned to insure the perfect operation of the locking bar, a longitudinal recess is formed in the section 5, which recess is of a size to receive the longitudinal rib 14 formed on the upper surface of the reduced portion of the extension 6. When the sections are brought together the rib will be moved to a position so that it may pass into the longitudinal recess of the section 5.

The reference character 15 designates a spring clip, which is secured to the arms 10 and so constructed that the clip may be forced downwardly over the section 6 to prevent movement of the arms 10, after they have been positioned or moved to lock the sections of the coupling together.

In the use of the device the reduced portion of the section 6 is positioned in the section 5, and the arms 10 are swung downwardly causing the locking bar to move in the recess of the extension 6 with the result that the extension 6 is forced into the section 5 in such a way as to insure a fluid tight connection between the sections, at the same time locking the sections together.

To disconnect the sections the arms 10 are swung upwardly to bring the cut out portion 12 of the bar 7 over the reduced end of the extension 6, whereupon the sections may be slid apart.

It will of course be understood that the recess 13 may encircle the section 6, eliminating the necessity of accurately positioning the section 6 in the section 5, to operate the device.

I claim:

A hose coupling comprising an outer tubular section and an inner tubular section, said outer section having a longitudinal internal groove, a rib disposed longitudinally of the inner section and adapted to fit within the groove to prevent rotary movement of the sections with respect to each other, said inner section having a recess, a pivoted locking bar disposed transversely of the outer section and having a cut away portion providing a clearance for the inner section, and said pivoted locking bar adapted to move into the recess of the inner section to lock the sections together.

In testimony that I claim the foregoing as my own, I have hereto affixed my signature.

LEANDER J. JONES.